(12) United States Patent
Montero et al.

(10) Patent No.: US 11,431,767 B2
(45) Date of Patent: Aug. 30, 2022

(54) CHANGING A COMMUNICATION SESSION

(71) Applicant: Sorenson IP Holdings, LLC, Salt Lake City, UT (US)

(72) Inventors: Adam Montero, Sandy, UT (US); Steven Burke, Lehi, UT (US)

(73) Assignee: Sorenson IP Holdings, LLC, Salt Lake City, UT (US)

( * ) Notice: Subject to any disclaimer, the term of this patent is extended or adjusted under 35 U.S.C. 154(b) by 137 days.

(21) Appl. No.: 15/991,608

(22) Filed: May 29, 2018

(65) Prior Publication Data

US 2019/0372824 A1    Dec. 5, 2019

(51) Int. Cl.
| | |
|---|---|
| G06F 15/16 | (2006.01) |
| H04L 65/401 | (2022.01) |
| H04L 65/1059 | (2022.01) |
| H04L 65/1069 | (2022.01) |

(52) U.S. Cl.
CPC ...... *H04L 65/4015* (2013.01); *H04L 65/1059* (2013.01); *H04L 65/1069* (2013.01)

(58) Field of Classification Search
CPC ......... H04L 29/06401; H04L 29/06306; H04L 29/06326
USPC .......................................................... 709/204
See application file for complete search history.

(56) References Cited

U.S. PATENT DOCUMENTS

| | | | |
|---|---|---|---|
| 8,861,537 B1 | 10/2014 | Braithwaite et al. | |
| 9,773,501 B1 | 9/2017 | Brooksby et al. | |
| 9,787,941 B1* | 10/2017 | Brooksby | H04N 7/147 |
| 2004/0240650 A1 | 12/2004 | Bear et al. | |
| 2010/0312897 A1* | 12/2010 | Allen | H04W 4/70 709/227 |
| 2011/0273526 A1 | 11/2011 | Mehin et al. | |
| 2012/0315881 A1* | 12/2012 | Woloshyn | G06F 3/0488 455/412.2 |
| 2015/0049867 A1 | 2/2015 | Jafry et al. | |
| 2015/0180822 A1 | 6/2015 | Mathias et al. | |
| 2015/0379562 A1 | 12/2015 | Spievak et al. | |
| 2016/0048841 A1 | 2/2016 | Johnson et al. | |
| 2016/0173693 A1 | 6/2016 | Spievak et al. | |

(Continued)

FOREIGN PATENT DOCUMENTS

CN            101835135 A          9/2010

OTHER PUBLICATIONS

Automatically Transcribe Cloud Recordings, Zoom Video Communications, Inc., https://support.zoom.us/Hc/En-Us/Articles/115004794983-Automatically-Transcribe-Cloud-Recordings-/Subscription, retrieved on Jan. 30, 2018.

(Continued)

*Primary Examiner* — Suraj M Joshi
*Assistant Examiner* — Joel Mesa
(74) *Attorney, Agent, or Firm* — Maschoff Brennan

(57) ABSTRACT

Operations related to establishing a first communication session between a first first-end device and a first second-end device. The first first-end device may obtain first device audio during the first communication session. The operations also include establishing a second communication session between a second first-end device and a second second-end device. In addition, the operations may include communicating the first device audio to the second second-end device as second session audio of the second communication session.

20 Claims, 4 Drawing Sheets

(56) References Cited

U.S. PATENT DOCUMENTS

2018/0007205 A1 1/2018 Klein et al.
2018/0324235 A1* 11/2018 Mufti ................. H04L 65/1006

OTHER PUBLICATIONS

Place a Video Call—HD Voice, Samsung Galaxy S 5 Support, Verzion Wireless, https://www.verizonwireless.com/support, retrieved on Jan. 30, 2018.

* cited by examiner

CHANGING A COMMUNICATION SESSION

FIELD

The embodiments discussed herein are related to changing a communication session.

BACKGROUND

Persons may interact with each other via communication sessions conducted between devices associated with the persons. The communication sessions may be audio communication sessions or video communication sessions or combinations thereof. The subject matter claimed herein is not limited to embodiments that solve any disadvantages or that operate only in environments such as those described above. Rather, this background is only provided to illustrate one example technology area where some embodiments described herein may be practiced.

SUMMARY

Operations related to establishing a first communication session between a first first-end device and a first second-end device. The first first-end device may obtain first device audio during the first communication session. The operations also include establishing a second communication session between a second first-end device and a second second-end device. In addition, the operations may include communicating the first device audio to the second second-end device as second session audio of the second communication session.

The objects and advantages of the embodiments will be realized and achieved at least by the elements, features, and combinations particularly pointed out in the claims. Both the foregoing general description and the following detailed description are given as examples and are explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Figure 1:
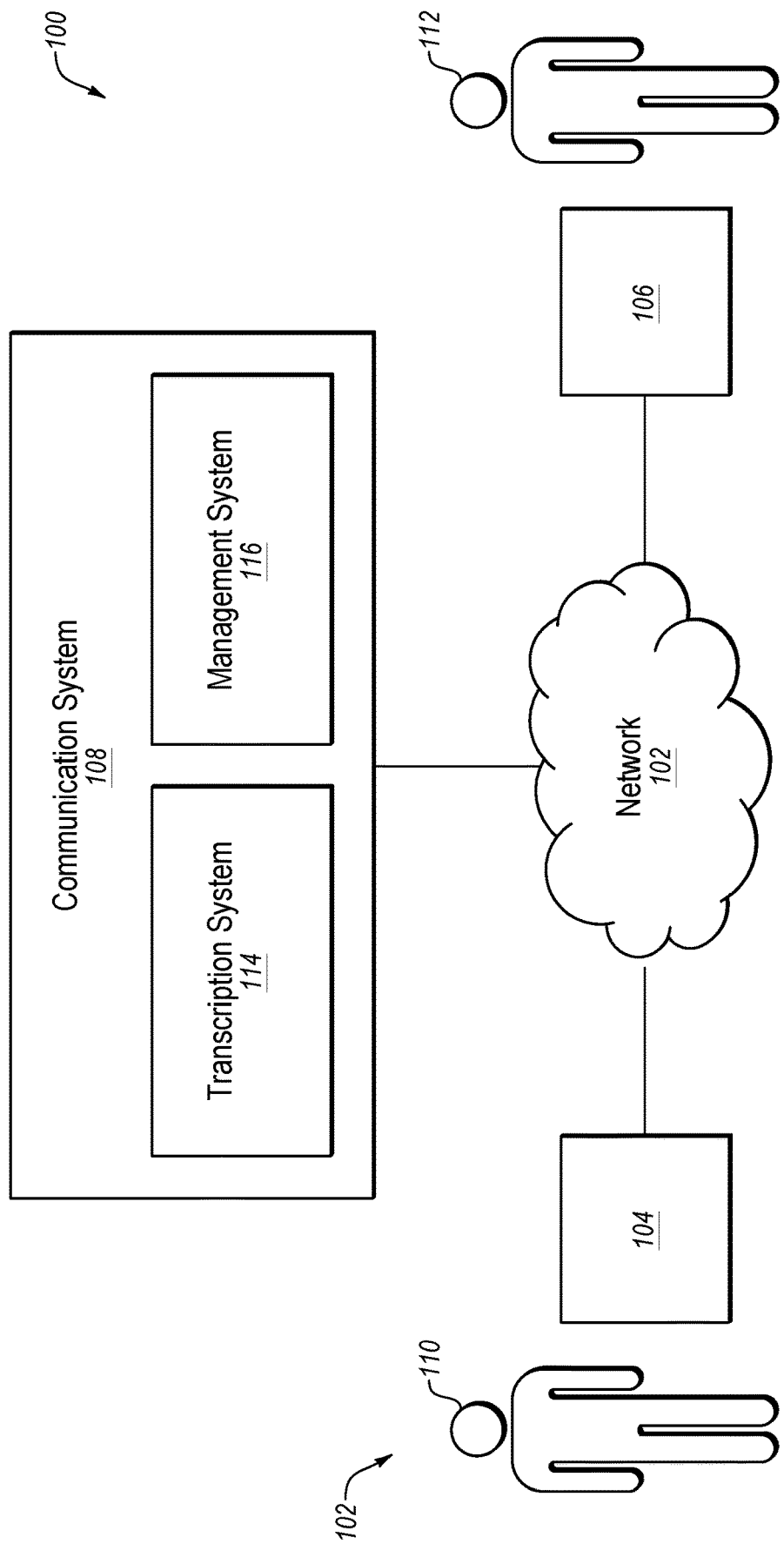
FIG. 1 illustrates an example environment related to managing communication sessions.

Some embodiments in this disclosure relate to systems and methods that may be configured to manage communication sessions between end devices associated with persons. For example, in some embodiments, a communication system may be configured to establish a communication session conducted between a first-end device and a second-end device. In these or other embodiments, the communication system may be configured to manage the communication session by relaying data associated with the communication session between the first-end device and the second-end device. Additionally or alternatively, the communication system may be configured to terminate the communication session. In these or other embodiments, the communication system may be configured to obtain a transcription of audio of the communication session. Additionally or alternatively, the communication system may be configured to provide the transcription to the first-end device and/or the second-end device during the communication session to assist a corresponding user to better understand what is being said during the communication session.

In some instances, a first user using a first communication session to interact with a second user may desire to continue the corresponding interaction via a second communication session. For example, the first communication session may have a low quality connection that may adversely affect audio and/or video quality such that it may be desired to establish the second communication session to help improve the audio and/or video quality. As another example, the first communication session may be an audio only communication session and it may be desired to establish a video communication session as the second communication session, or vice versa.

In some embodiments, as explained in detail below, the communication system may be configured to perform operations related to transitioning between the first communication session and the second communication with respect to an interaction. The operations may be performed in a manner that helps maintain continuity in the interaction conducted via the first and second communication sessions. In these or other embodiments, the operations may help maintain continuity in corresponding information that may be associated with the interaction.

For example, in some embodiments, the communication system may be configured to maintain the first communication session while establishing the second communication session. In these or other embodiments, the communication system may be configured to communicate, as second session audio of the second communication session, first device audio generated by first session devices of the first communication session to second session devices of the second communication session. In these or other embodiments, the communication system may be configured to communicate the first device audio as the second session audio for a particular amount of time. After the particular amount of time, the communication system may be configured to communicate second device audio generated by the second session devices as the second session audio. In these or other embodiments, the communication system may be configured to terminate the first communication session after the particular amount of time.

The communication of the first device audio to the second session devices for the particular amount of time instead of the communication of the second device audio may help make the transition from the first communication session to the second communication session more seamless. For instance, the communication of the first device audio to the second session devices for the particular amount of time may reduce or eliminate echoing or synching issues with respect to the first device audio and the second device audio while both the first communication session and the second communication session are established during the transition between the first communication session and the second communication session.

As used in this disclosure, the term audio may be used generically to refer to sounds that may include spoken words. Furthermore, the term "audio" may be used generically to include audio in any format, such as a digital format, an analog format, or an acoustic wave format. Furthermore, in the digital format, the audio may be compressed using different types of compression schemes. Also, as used in this disclosure, the term "video" may be used generically to refer to a compilation of images that may be reproduced in a sequence to produce video. Furthermore, the term "video" may be used generically to include video in any format, such as a digital format, an analog format, or a visual presentation format. In addition, in the digital format, the video may be compressed using different types of compression schemes.

Turning to the figures, FIG. 1 illustrates an example environment 100 related to managing communication sessions. The environment 100 may be arranged in accordance with at least one embodiment described in the present disclosure. The environment 100 may include a network 102, a first-end device 104, a second-end device 106, and a communication system 108. The communication system 108 may include a transcription system 114 and a management system 116.

The network 102 may be configured to communicatively couple the first-end device 104, the second-end device 106, and the communication system 108. In some embodiments, the network 102 may be any network or configuration of networks configured to send and receive communications between systems and devices. In some embodiments, the network 102 may include a conventional type network, a wired network, an optical network, and/or a wireless network, and may have numerous different configurations. In some embodiments, the network 102 may also be coupled to or may include portions of a telecommunications network, including telephone lines, for sending data in a variety of different communication protocols, such as a plain old telephone system (POTS).

Each of the first and second end devices 104 and 106 may be any electronic or digital computing device. For example, each of the first and second end devices 104 and 106 may include a desktop computer, a laptop computer, a smartphone, a mobile phone, a tablet computer, a telephone, a phone console, a caption device, a captioning telephone, or any other computing device that may be used for communication between users of the first-end device 104 and the second-end device 106.

In some embodiments, each of the first-end device 104 and the second-end device 106 may include memory and at least one processor, which are configured to perform operations as described in this disclosure, among other operations. In some embodiments, each of the first-end device 104 and the second-end device 106 may include computer-readable instructions that are configured to be executed by each of the first-end device 104 and the second-end device 106 to perform operations described in this disclosure.

In some embodiments, each of the first-end device 104 and the second-end device 106 may be configured to conduct communication sessions with other devices. For example, each of the first-end device 104 and the second-end device 106 may be configured to conduct an outgoing communication session, such as a telephone call, video call, or other communication session, with another end device over a telephone line or network. For example, each of the first-end device 104 and the second-end device 106 may communicate over a wireless cellular network, a wired Ethernet network, an optical network, or a POTS line.

In some embodiments, each of the first-end device 104 and the second-end device 106 may be configured to obtain media during a communication session. The media may include audio and/or video. The media may be part of a video communication session (e.g., a video call) or an audio communication session (e.g., a telephone call).

As an example of obtaining audio, the first-end device 104 may be configured to obtain first audio of a first user 110. For example, the first-end device 104 may obtain the first audio from a microphone of the first-end device 104 or from another device that is communicatively coupled to the first-end device 104. As an example of obtaining video, the first-end device 104 may be configured to obtain first video that may be of the first user 110, surroundings of the first user 110, or another setting. For example, the first-end device 104 may obtain the first video from a video-camera of the first-end device 104 or from another device that is communicatively coupled to the first-end device 104.

The second-end device 106 may also be configured to obtain second audio of a second user 112. In some embodiments, the second-end device 106 may obtain the second audio from a microphone of the second-end device 106 or from another device communicatively coupled to the second-end device 106. Additionally or alternatively, the second-end device 106 may be configured to obtain second video that may be of the second user 112, surroundings of the second user 112, or another setting. For example, the second-end device 106 may obtain the second video from a video-camera of the second-end device 106 or from another device that is communicatively coupled to the second-end device 106.

During the communication session, the first-end device 104 may provide the first media to the communication system 108 for the second-end device 106. Alternatively or additionally, the second-end device 106 may provide the second media to the communication system 108 for the first-end device 104.

The communication system 108 may include any configuration of hardware, such as processors, servers, and/or database servers that are communicatively coupled and configured to perform one or more tasks. For example, the communication system 108 may include one or multiple computing systems, such as multiple servers that each include memory and at least one processor. As indicated above, the communication system 108 may include the management system 116 and the transcription system 114. In some embodiments, the management system 116 and the transcription system 114 may be part of or included in one or more of the same computing systems. Additionally or alternatively, the management system 116 and the transcription system 114 may be separate systems that do not share any computing systems.

In some embodiments, the management system 116 may be configured to manage communication sessions conducted between the first-end device 104 and the second-end device 106. For example, the management system 116 may be configured to receive a request from the first-end device 104 to establish a communication session with the second-end device 106. The management system 116 may forward the request to the second-end device 106. In these or other embodiments, the second-end device 106 may accept the request and may relay the acceptance to the management system 116. Additionally or alternatively, the management system 116 may establish a communication session between the first-end device 104 and the second-end device in response to receiving the acceptance of the request. For example, the management system 116 may establish a communication link between the first-end device 104 and the second-end device 106 over which the first-end device 104 and the second-end device 106 may send media associated with the communication session.

In these or other embodiments, the management system 116 may be configured to relay the media associated with the communication session between the first-end device 104 and the second-end device 106 during the communication session. For example, in some embodiments, the management system 116 may be configured to relay to the second-end device 106, over the communication link, the first video and/or the first audio of the communication session that is obtained by the first-end device 104. Similarly, the management system 116 may be configured to relay to the first-end device 104, over the communication link, the second video and/or the second audio of the communication session that is obtained by the second-end device 106.

In these or other embodiments, the management system 116 may be configured to terminate the communication session. For example, in response to an indication (e.g., received from the first-end device 104 and/or the second-end device 106) to terminate the communication session, the management system 116 may terminate the communication session by terminating (sometimes referred to as "tearing down") the communication link of the communication session. Additionally or alternatively, the management system 116 may be configured to terminate the communication session based on another communication session associated with a same interaction between users being established, such as detailed below with respect to FIG. 2.

The transcription system 114 may be configured to generate a transcription of the audio of the communication session (referred to as "session audio"). In some embodiments, the transcription system 114 may obtain the session audio from the first-end device 104 and the second-end device 106. Additionally or alternatively, the management system 116 may communicate the session audio to the transcription system 114.

The transcription system 114 may be configured to recognize speech in the session audio. Based on the recognized speech, the transcription system 114 may generate and output a transcription of the speech. The transcription may be a written version of the speech in the session audio. In some embodiments, the transcription system 114 may generate the transcription using a fully machine based automatic speech recognition (ASR) system.

Alternatively or additionally, the transcription system 114 may obtain the transcription using a re-voicing transcription system. Re-voicing transcription systems may receive and broadcast audio to a person who is a captioning agent. The captioning agent may listen to the broadcast and speak the words from the broadcast. The words spoken by the captioning agent are captured to generate re-voiced audio. The re-voiced audio may be used by a speech recognition program that is trained to the voice of the captioning agent to generate the transcription of the session audio.

The transcription system 114 may be configured to provide the generated transcription of the session audio to either one or both of the first-end device 104 and the second-end device 106. Either one or both of the first-end device 104 and the second-end device 106 may be configured to present the transcription received from the transcription system 114. For example, the first-end device 104 may be configured to display the received transcriptions on a display that is part of the first-end device 104 or that is communicatively coupled to the first-end device 104.

As described in further detail below, in some embodiments, the communication system 108 may be configured to perform operations related to transitioning from one communication session between the first-end device 104 and the second-end device to another communication session between the first-end device 104 (or another first-end device) and the second-end device 106 (or another second-end device). For example, the management system 116 may be configured to perform operations related to establishing the communication sessions and the relaying of media associated with the communication sessions. In these or other embodiments, the transcription system 114 may be configured to generate and/or modify one or more transcriptions related to the communication sessions. In some embodiments, the management of the communication sessions and corresponding media may be performed according to one or more operations described in detail below with respect to FIG. 2.

Modifications, additions, or omissions may be made to the environment 100 without departing from the scope of the present disclosure. For example, in some embodiments, the transcription system 114 may include additional functionality. For example, the transcription system 114 may edit the transcriptions or make other alterations to the transcriptions after presentation of the transcriptions one or both of the first-end device 104 and the second-end device 106. Alternatively or additionally, in some embodiments, the environment 100 may include additional devices similar to the first and second end devices 104 and 106. In these and other embodiments, the similar devices may be configured to perform operations as described in the present disclosure.

As another example, in some embodiments, the components of the communication system 108 may be coupled over a network. For example, the transcription system 114 may be communicatively coupled with the management system 116 over a network, such as the network 102.

Figure 2:
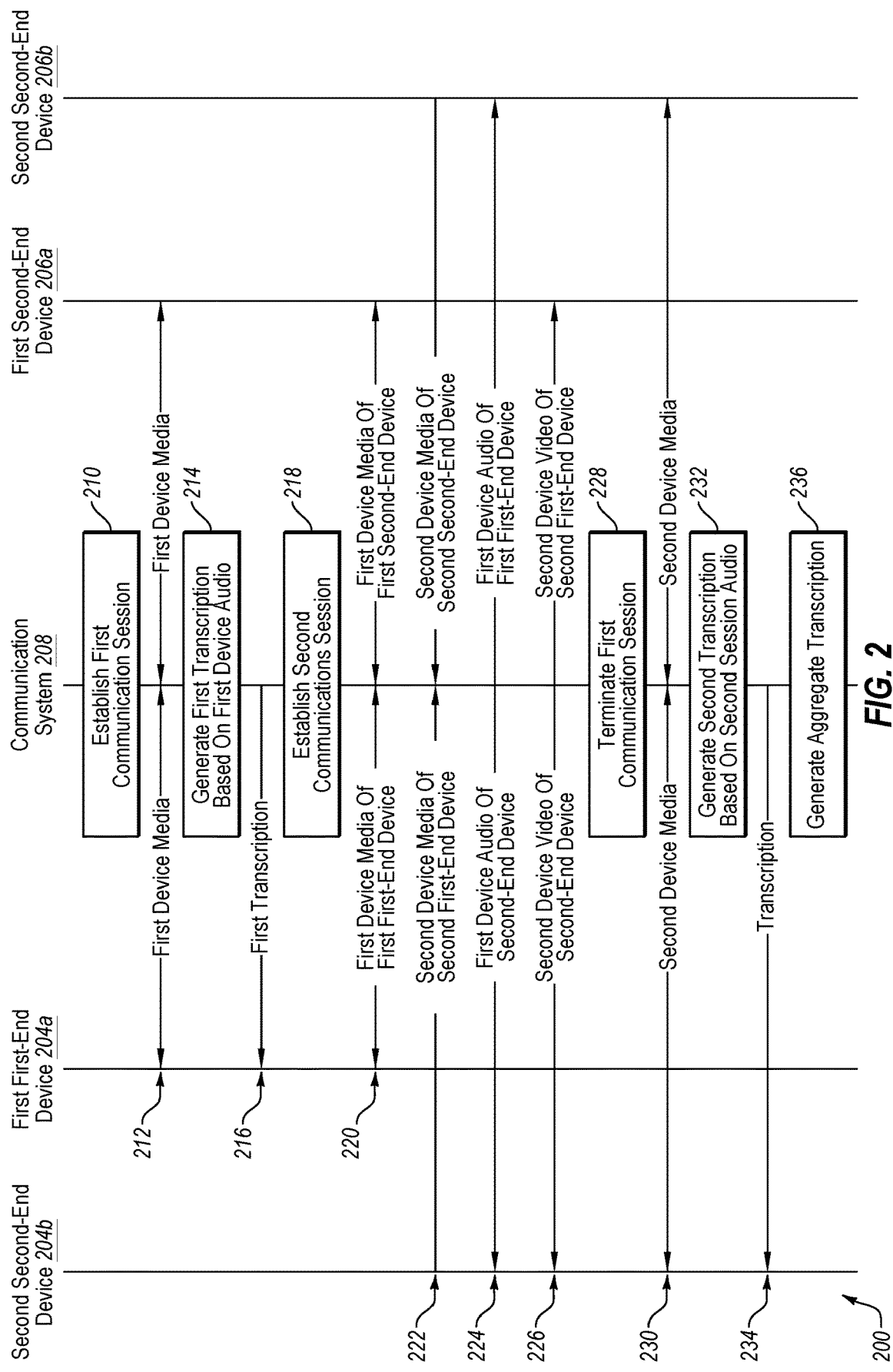
FIG. 2 illustrates example operations to manage communication sessions.

FIG. 2 illustrates example operations 200 to manage communication sessions. The operations 200 may be arranged in accordance with at least one embodiment described in the present disclosure. The operations 200 may be between one or more first-end devices 204, one or more second-end devices 206, and a communication system 208. In some embodiments, the communication system 208 may be a combination of hardware devices, such as processors, memory, modems, and other hardware devices that perform the functions described herein. Alternatively or additionally, the first-end devices 204, the second-end devices 206, and the communication system 208 may be analogous to the first-end device 104, the second-end device 106, and the communication system 108, respectively, of FIG. 1. Accordingly, no further explanation is provided with respect thereto. Alternatively or additionally, the operations 200 may be an example of the operation of the elements of the environment of FIG. 1.

In some embodiments, the operations 200 may be an example of communications and interactions between the first-end devices 204, the second-end devices 206, and the communication system 208. In some embodiments, the interactions between the first-end devices 204, the second-end devices 206 and the communication system 208 may occur over one or more networks. Generally, the operations 200 may relate to management of communication sessions between one or more of the first-end devices 204 and one or more of the second-end devices 206. The operations 200 illustrated are not exhaustive but are merely representative of operations 200 that may occur. Furthermore, one operation as illustrated may represent one or more communications, operations, and/or data exchanges.

In addition, to ease explanation, the operations 200 are described with respect to a first communication session between a first first-end device 204*a* and a first second-end device 206*a* and with respect to a second communication session between a second first-end device 204*b* and a second second-end device 206*b*. The first first-end device 204*a* and the second first-end device 204b may be referred to collectively as "first-end devices 204". Similarly, the first second-end device 206a and the second second-end device 206b may be referred to collectively as "second-end devices 206". Additionally, the first first-end device 204a and the first second-end device 206a may be referred to generally as "first session devices." Further, the second first-end device 204b and the second second-end device 206b may be referred to generally as "second session devices."

In some embodiments, the first first-end device 204a and the second first-end device 204b may be different devices. In other embodiments, although referred to and depicted separately in FIG. 2 and the corresponding description, the first first-end device 204a and the second first-end device 204b may be the same device. Similarly, in some embodiments, the first second-end device 206a and the second second-end device 206b may be different devices. In other embodiments, although referred to and depicted separately in FIG. 2 and the corresponding description, the first second-end device 206a and the second second-end device 206b may be the same device.

At operation 210, a first communication session between the first first-end device 204a and the first second-end device 206a may be established. In some embodiments, the communication system 208 may establish the first communication session such as described above with respect to FIG. 1 (e.g., via a management system such as the management system 116 of FIG. 1). The first communication session may be an audio or video communication session. Additionally, the first first-end device 204a and the first second-end device 206a may obtain first device media during the first communication session. The first device media may include first device audio and/or first device video. In the present disclosure, use of the terms "first device media," "first device audio" and "first device video" may refer to media, audio, or video, respectively, that may be obtained by the first first-end device 204a and/or the first second-end device 206a in association with the first communication session.

At operation 212, the first device media is exchanged between the first first-end device 204a and the first second-end device 206a. In some embodiments, the first first-end device 204a may provide to the communication system 208 the first device media that may be obtained by the first first-end device 204a. Additionally or alternatively, the first second-end device 206a may provide to the communication system 208 the first device media that may be obtained by the first second-end device 206a. In some embodiments, the communication system 208 may relay (e.g., via the management system) the first device media that is provided by the first first-end device 204a to the first second-end device 206a. Additionally or alternatively, the communication system 208 may relay (e.g., via the management system) the first device media that is provided by the first second-end device 206a to the first first-end device 204a. The first device media may be exchanged in association with the first communication session such that the first device media may be used as first session media of the first communication session.

In some embodiments, at operation 214, the communication system 208 may be configured to generate a first transcription based on the first device audio. For example, a transcription system of the communication system 208 (e.g., the transcription system 114 of FIG. 1) may be configured to identify first speech of the first device audio and generate the first transcription based on the first speech. In some embodiments, the process of transcription generation may continue as first device audio may be streamed to the transcription system in real-time during the first communication session.

In some embodiments, at operation 216, the communication system 208 may communicate the first transcription to the first first-end device 204a. In these or other embodiments, the communication system 208 may communicate the first transcription to the first second-end device 206a. Additionally or alternatively, the communication system 208 may communicate the first transcription of the first device audio in real-time to one or both of the first first-end device 204a and the first second-end device 206a for presentation. In these and other embodiments, the generation and streaming of the first transcription of the first device audio at operations 214 and 216 may be occurring in real-time with a delay. For example, the generation and streaming of the first transcription may cause a delay of between one and fifteen seconds between presentation of first device audio on a first device and presentation of a transcription of the first device audio on the first device.

At operation 218, a second communication session between the second first-end device 204b and the second second-end device 206b may be established. Additionally, the second first-end device 204b and the second second-end device 206b may obtain second device media during the second communication session. The second device media may include second device audio and/or second device video. In the present disclosure, use of the terms "second device media," "second device audio" and "second device video" may refer to media, audio, or video, respectively, that may be obtained by the second first-end device 204b and/or the second second-end device 206b in association with the second communication session.

In some embodiments, the communication system 208 may establish the second communication session such as described above with respect to FIG. 1 (e.g., via a management system such as the management system 116 of FIG. 1). In these or other embodiments, the communication system 208 may establish the second communication session while the first communication session is active. Additionally or alternatively, the communication system 208 may establish the second communication session in response to a request received from the second first-end device 204b or the second second-end device 206b.

In some instances, the second communication session may be of a same type as the first communication session. For example, both the first and second communication sessions may be audio only communication sessions in some instances. In other instances, the second communication session may be of a different type than the first communication session. For example, the first communication session may be an audio only communication session and the second communication session may be a video communication session.

In these or other embodiments, the first communication session and the second communication session may be associated with a same interaction between users. For example, the first first-end device 204a and the second first-end device 204b may be used by a first user during the interaction and the first second-end device 206a and the second second-end device 206b may be used by a second user during the interaction. Additionally, as mentioned above, in some instances the first first-end device 204a and the second first-end device 204b may be the same device. Alternatively, the first first-end device 204a and the second first-end device 204b may be different devices that may both be associated with the first user. Similarly, as mentioned above, in some instances the first second-end device 206a and the second second-end device 206b may be the same device. Alternatively, the first second-end device 206a and the second second-end device 206b may be different devices that may both be associated with the second user.

In some embodiments, the request to establish the second communication session may be an indication to change the interaction. For example, the first communication session may have a low quality connection that may adversely affect the interaction with low audio and/or video quality. As such, the request to establish the second communication session may be to change the interaction by improving the audio and/or video quality. As another example, the first communication session may be an audio only communication session and the interaction may be changed by establishing a video communication session as the second communication session. As another example, the first communication session may be a video communication session and the interaction may be changed by establishing an audio only communication session as the second communication session.

At operation 220, the communication system 208 may receive the first device media that may be obtained by the first first-end device 204a in association with the first communication session. Additionally or alternatively, at operation 220, the communication system 208 may receive the first device media that may be obtained by the first second-end device 206a in association with the first communication session.

At operation 222, the communication system 208 may receive the second device media that may be obtained by the second first-end device 204b in association with the second communication session. Additionally or alternatively, at operation 222, the communication system 208 may receive the second device media that may be obtained by the second second-end device 206b in association with the second communication session. In some embodiments, the operations 220 and 222 may occur at the same time or substantially the same time.

At operation 224, the communication system 208 may communicate the first device audio of the first session devices to the second session devices as second session audio of the second communication session. Additionally or alternatively, the first device audio may be communicated as the second session audio instead of the second device audio being communicated as the second session audio.

By way of example, the communication system 208 may communicate, to the second second-end device 206b, the first device audio included in the first device media that may be received from the first first-end device 204a at operation 220. The first device audio received from the first first-end device 204a may be communicated to the second second-end device 206b in association with the second communication session such that the first device audio received from the first first-end device 204a may be used as second session audio of the second communication session. The communication system 208 may similarly communicate, to the second first-end device 204b, the first device audio included in the first device media that may be received from the first second-end device 206a at operation 220.

In some embodiments, the communication system 208 may be configured to communicate the first device audio as second session audio of the second communication session based on a determination that the first communication session and the second communication session are associated with the same interaction between users. For example, in instances in which the first first-end device 204a and the second first-end device 204b are the same device or the first second-end device 206a and the second second-end device 206b are the same device, the communication system 208 may be configured to determine that the first communication session and the second communication session are associated with the same interaction.

As another example, in instances in which the first session devices are different from the second session devices, the communication system 208 may be configured to determine whether the first session devices and the second session devices are associated with the same users. For example, the communication system 208 may be configured to determine whether the first first-end device 204a and the second first-end device 204b are both associated with the first user. Additionally or alternatively, the communication system 208 may be configured to determine whether the first second-end device 206a and the second second-end device 206b are both associated with the second user. Based on determining that the first first-end device 204a and the second first-end device 204b are both associated with the first user and/or that the first second-end device 206a and the second second-end device 206b are both associated with the second user, the communication system 208 may be configured to determine that the first communication session and the second communication session are associated with the same interaction.

The communication system 208 may be configured to determine whether the first session devices and the second session devices are associated with the same users using any suitable technique. For example, in some embodiments, a first user profile of the first user may indicate that the first first-end device 204a and the second first-end device 204b are both associated with the first user. In these or other embodiments, the communication system 208 may be configured to determine based on the first user profile and based on identifiers associated with the first first-end device 204a and the second first-end device 204b (e.g., included in the first user profile and communicated to the communication system 208 by the first first-end device 204a and the second first-end device 204b) that the first first-end device 204a and the second first-end device 204b are both associated with the first user.

As another example, the first user may use a same login in conjunction with participating in the first communication session and the second communication session via the first first-end device 204a and the second first-end device 204b. The communication system 208 may be configured to determine, based on the same login, that the first user is associated with the first first-end device 204a and the second first-end device 204b.

As another example, the first first-end device 204a and the second first-end device 204b may provide information to the communication system 208 regarding a network (e.g., a wireless network) to which the first first-end device 204a and the second first-end device 204b are connected. Based on the information indicating that the first first-end device 204a and the second first-end device 204b are connected to a same network, the communication system 208 may be configured to determine that the first user is associated with the first first-end device 204a and the second first-end device 204b. The above examples of determining whether the first user is associated with the first first-end device 204a and the second first-end device 204b may also be used to determine whether the second user is associated with the first second-end device 206a and the second second-end device 206b.

In some embodiments, at operation 226, the communication system 208 may communicate the second device video that is associated with the second communication session to the second session devices as second session video of the second communication session. For example, the communication system 208 may communicate, to the second second-end device 206b, the second device video included in the second device media that may be received from the second first-end device 204b at operation 222. The second device video received from the second first-end device 204b may be communicated to the second second-end device 206b in association with the second communication session such that the second device audio received from the second first-end device 204b may be communicated to the second second-end device 206b as second session video of the second communication session. The communication system 208 may similarly communicate, to the second first-end device 204b, the second device video included in the second device media that may be received from the second second-end device 206b at operation 222. In some embodiments, the communication system 208 may communicate the second device video to the second session devices while also communicating the first device audio to the second session devices.

At operation 228, the communication system 208 may terminate the first communication session. In some embodiments, the communication system 208 may be configured to terminate the first communication session by tearing down a communication link that corresponds to the first communication session.

In some embodiments, the communication system 208 may terminate the first communication session in response to the second communication session being established. Additionally or alternatively, the communication system 208 may be configured to terminate the first communication session based on a determination that the first communication session and the second communication session are associated with the same interaction between users, such as described above with respect to the operation 224.

In these or other embodiments, the communication system 208 may be configured to terminate the first communication session in response to a particular amount of time passing from when the second communication session was established. The particular amount of time may be based on factors such as specific configurations of the end devices, consumer feedback, system constraints, consumer retention, and system use, among others. By way of example, the particular amount of time may be anywhere between 1 second to 2 minutes.

At operation 230, the second device media may be exchanged between the second first-end device 204b and the second second-end device 206b as second session media. The second device media exchanged at operation 230 may include the second device audio such that the second device audio may be used as the second session audio at operation 230.

In some embodiments, the second first-end device 204b may provide to the communication system 208 the second device media that may be obtained by the second first-end device 204b. Additionally or alternatively, the second second-end device 206b may provide to the communication system 208 the second device media that may be obtained by the second second-end device 206b. In some embodiments, the communication system 208 may relay (e.g., via the management system) the second device media provided by the second first-end device 204b to the second second-end device 206b. Additionally or alternatively, the communication system 208 may relay (e.g., via the management system) the second device media provided by the second second-end device 206b to the second first-end device 204b.

In some embodiments, at operation 232, the communication system 208 may be configured to generate a second transcription based on the second device audio. For example, the transcription system of the communication system 208 may be configured to identify second speech of the second device audio and generate the second transcription based on the second speech. In some embodiments, the process of transcription generation may continue as second device audio may be streamed to the transcription system in real-time during the second communication session.

In some embodiments, at operation 232, the communication system 208 may communicate the second transcription to the second first-end device 204b. In these or other embodiments, the communication system 208 may communicate the second transcription to the second second-end device 206b. Additionally or alternatively, the communication system 208 may communicate the second transcription of the second audio in real-time to one or both of the second first-end device 204b and the second second-end device 206b for presentation. In these and other embodiments, the generation and streaming of the second transcription of the second session audio at operations 230 and 232 may be occurring in real-time with a delay. For example, the generation and streaming of the second transcription may cause a delay of between one and fifteen seconds between presentation of second device audio on a second device and presentation of a transcription of the second device audio on the second device.

In some embodiments, at operation 234, the communication system 208 may be configured to generate an aggregate transcription of the interaction that may correspond to the first communication session and the second communication session. In some embodiments, the aggregate transcription may be generated based on the first device audio of the first communication session and the second device audio of the second communication session.

For example, the transcription system of the communication system 208 may be configured to generate the aggregate transcription by combining the first transcription (which may be generated based on the first device audio) with the second transcription (which may be generated based on the second device audio). For instance, the aggregate transcription may include portions of the first transcription that were generated before establishment of the second communication session. In these or other embodiments, the aggregate transcription may include portions of the first transcription and/or of the second transcription that were generated while both the first communication session and the second communication session were established at the same time. In these or other embodiments, the aggregate transcription may include portions of the second transcription that were generated after termination of the first communication session.

Additionally or alternatively, the transcription system may be configured to generate the aggregate transcription separate from the generation of the first transcription and/or of the second transcription. For example, the transcription system may be configured to identify the first speech and the second speech (apart from the speech identification done with respect to the first transcription and second transcription generation). In these or other embodiments, the transcription system may be configured to generate the aggregate transcription based on the first speech and/or the second speech. In some embodiments, the process of transcription generation may continue as first device audio may be streamed to the transcription system in real-time during the first communication session and as second device audio may be streamed to the transcription system in real-time during the second communication session.

In these or other embodiments, the transcription system may be configured to include in the aggregate transcription other text that may be associated with the interaction between the first user and the second user. For example, in some embodiments, the other text may include text messages, emails, social media posts, instant messages, etc. that may be part of the interaction. In these or other embodiments, the communications associated with the other text may be included with or part of the first communication session and/or the second communication session.

In some embodiments, the communication system 208 may be configured to generate one or more indications with respect to the aggregate transcription. In some embodiments, the indications may include notations or tags included in the aggregate transcription. Additionally or alternatively, the indications may include metadata that may be included with corresponding transcription data of the aggregate transcription. The indications may be related to establishment of the second communication session and/or termination of the first communication session.

For example, in some embodiments, the transcription system may be configured to generate a first indication with respect to a first portion of the aggregate transcription. The first portion may correspond to a first time that is associated with when the second communication session was established. In these or other embodiments, the first indication may indicate that the second communication session was established at the first time. Additionally or alternatively, the first indication may indicate a communication session type of the second communication session. For example, in instances in which the second communication session is a video communication session, the first indication may indicate such. In these or other embodiments, the first indication may also indicate a communication session type of the first communication session such that the first indication may indicate whether there was a change in communication type.

As another example, the transcription system may be configured to generate a second indication with respect to a second portion of the aggregate transcription. The second portion may correspond to a second time that is associated with when the first communication session is terminated. In these or other embodiments, the second indication may indicate that the first communication session was terminated at the second time. Additionally or alternatively, the second indication may indicate the communication session type of the second communication session. In these or other embodiments, the second indication may also indicate the communication session type of the first communication session.

As another example, the transcription system may be configured to generate a third indication with respect to a third portion of the aggregate transcription. The third portion may correspond to a time period that is associated with when both the first communication session and the second communication session are active (e.g., the time period between the first time and the second time). In these or other embodiments, the third indication may indicate that the first communication session and the second communication session were active during the time period. Additionally or alternatively, the third indication may indicate the communication session type of the first communication session and/or of the second communication session. In these or other embodiments, the third indication may also indicate whether the third portion is generated based on the first device audio of the first communication session, the second device audio of the second communication session, or a combination of the first device audio and the second device audio. Additionally or alternatively, the third indication may indicate whether the third portion is based on the first transcription, the second transcription, or a combination of the first transcription and the second transcription.

Modifications, additions, or omissions may be made to the operations 200 without departing from the scope of the present disclosure. For example, the operations 200 may not include the operation 224 in some embodiments in which the second communication session may not be a video communication session. As another example, in some embodiments, the operations 200 may be arranged in a different order. For example, the operations 214, 216, 230, 232 and 234 may be ongoing or repeating operations that may occur at various points while other operations of the operations 200 are occurring. For instance, one or more operations associated with the operations 230, 232, and 234 may be performed after the second communication session has been established at operation 218 and before the first communication session has been terminated at operation 226. For instance, while the first communication session and the second communication session are both active, the first transcription, the second transcription, and/or the aggregate transcription may be generated. Additionally or alternatively, while the first communication session and the second communication session are both active, the first transcription, the second transcription, and/or the aggregate transcription may be communicated to one or more of the first-end devices 204 and/or one or more of the second-end devices 206.

Figure 3:
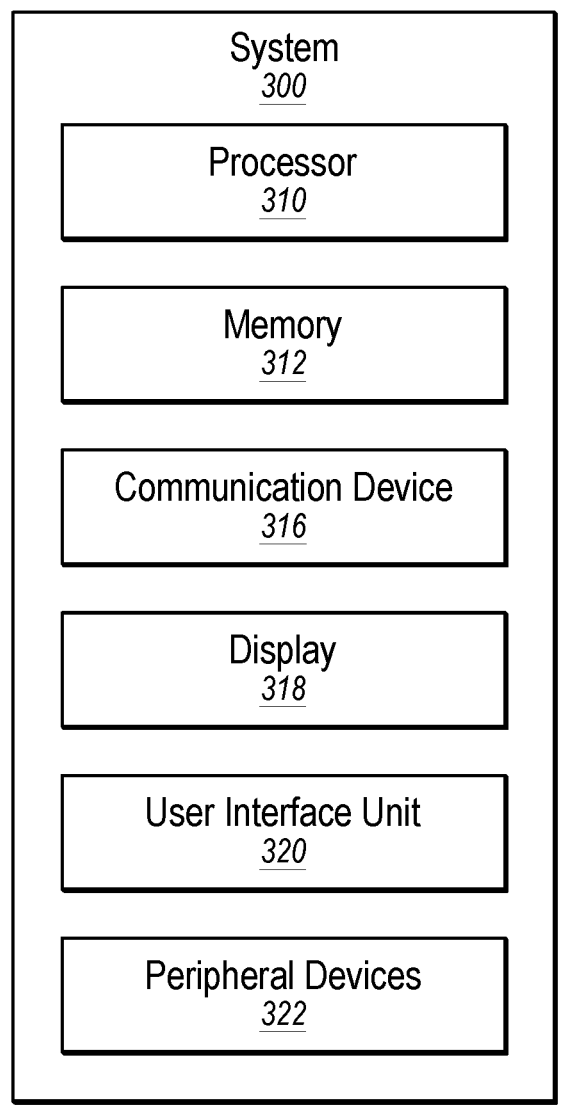
FIG. 3 illustrates an example computing system that may be used to manage communication sessions.

FIG. 3 illustrates an example computing system 300 that may be used to manage communication sessions. The system 300 may be arranged in accordance with at least one embodiment described in the present disclosure. The system 300 may include a processor 310, memory 312, a communication unit 316, a display 318, a user interface unit 320, and a peripheral device 322, which all may be communicatively coupled. In some embodiments, the system 300 may be part of any of the systems or devices described in this disclosure.

For example, the system 300 may be part of the first-end device 104 of FIG. 1 or the first-end devices 204 of FIG. 2 and may be configured to perform one or more of the operations described above with respect to the first-end devices. As another example, the system 300 may be part of the second-end device 106 of FIG. 1 or the second-end devices 206 of FIG. 2 and may be configured to perform one or more of the operations described above with respect to the second-end devices. As another example, the system 300 may be part of the communication system 108 of FIG. 1 or the communication system 208 of FIG. 2 and may be configured to perform one or more of the operations described above with respect to the transcription systems. As another example, the system 300 may be part of the transcription system 114 of FIG. 1 and may be configured to perform one or more of the operations described above with respect to the transcription system 114. As another example, the system 300 may be part of the management system 116 of FIG. 1 and may be configured to perform one or more of the operations described above with respect to the management system 116.

Generally, the processor 310 may include any suitable special-purpose or general-purpose computer, computing entity, or processing device including various computer hardware or software modules and may be configured to execute instructions stored on any applicable computer-readable storage media. For example, the processor 310 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 3, it is understood that the processor 310 may include any number of processors distributed across any number of networks or physical locations that are configured to perform individually or collectively any number of operations described herein. In some embodiments, the processor 310 may interpret and/or execute program instructions and/or process data stored in the memory 312. In some embodiments, the processor 310 may execute the program instructions stored in the memory 312.

For example, in some embodiments, processor 310 may execute program instructions stored in the memory 312 that are related to managing communication sessions such that the system 300 may perform or direct the performance of the operations associated therewith as directed by the instructions. In these and other embodiments, instructions may be used to perform one or more operations of the operations 200 of FIG. 2 or of the method 400 of FIG. 4.

The memory 312 may include computer-readable storage media or one or more computer-readable storage mediums for carrying or having computer-executable instructions or data structures stored thereon. Such computer-readable storage media may be any available media that may be accessed by a general-purpose or special-purpose computer, such as the processor 310. By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 310 to perform a certain operation or group of operations as described in this disclosure. In these and other embodiments, the term "non-transitory" as explained in the present disclosure should be construed to exclude only those types of transitory media that were found to fall outside the scope of patentable subject matter in the Federal Circuit decision of In re Nuijten, 500 F.3d 1346 (Fed. Cir. 4007). Combinations of the above may also be included within the scope of computer-readable media.

The communication unit 316 may include any component, device, system, or combination thereof that is configured to transmit or receive information over a network. In some embodiments, the communication unit 316 may communicate with other devices at other locations, the same location, or even other components within the same system. For example, the communication unit 316 may include a modem, a network card (wireless or wired), an infrared communication device, a wireless communication device (such as an antenna), and/or chipset (such as a Bluetooth device, an 802.6 device (e.g., Metropolitan Area Network (MAN)), a WiFi device, a WiMax device, cellular communication facilities, etc.), and/or the like. The communication unit 316 may permit data to be exchanged with a network and/or any other devices or systems described in the present disclosure. For example, when the system 300 is included in the first-end device 104 of FIG. 1, the communication unit 316 may allow the first-end device 104 to communicate with the communication system 108.

The display 318 may be configured as one or more displays, like an LCD, LED, or other type of display. The display 318 may be configured to present video, text captions, user interfaces, and other data as directed by the processor 310. For example, when the system 300 is included in the first-end device 104 of FIG. 1 or the first-end devices 204 of FIG. 2, the display 318 may be configured to present second video from a second-end device and/or a transcript of second audio from the second-end device. As another example, when the system 300 is included in the second-end device 106 of FIG. 1 or the second-end devices 206 of FIG. 2, the display 318 may be configured to present first video from a first-end device and/or a transcript of first audio from the first-end device.

The user interface unit 320 may include any device to allow a user to interface with the system 300. For example, the user interface unit 320 may include a mouse, a track pad, a keyboard, buttons, and/or a touchscreen, among other devices. The user interface unit 320 may receive input from a user and provide the input to the processor 310.

The peripheral devices 322 may include one or more devices. For example, the peripheral devices may include a microphone, an imager, and/or a speaker, among other peripheral devices. In these and other embodiments, the microphone may be configured to capture audio. The imager may be configured to capture digital images. The digital images may be captured in a manner to produce video or image data. In some embodiments, the speaker may broadcast audio received by the system 300 or otherwise generated by the system 300.

Modifications, additions, or omissions may be made to the system 300 without departing from the scope of the present disclosure. For example, in some embodiments, the system 300 may include any number of other components that may not be explicitly illustrated or described. Further, depending on certain implementations, the system 300 may not include one or more of the components illustrated and described. For instance, the system 300 may not include one or more of: the display 318, the user interface unit 320, and peripheral device 322.

Figure 4:
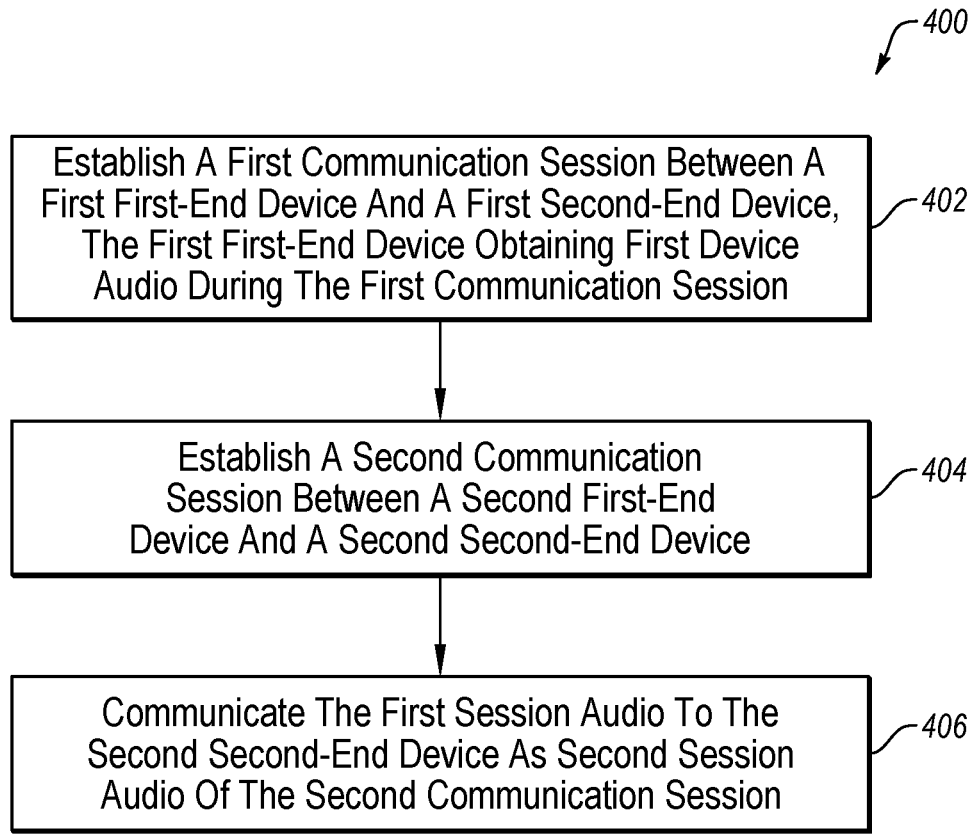
FIG. 4 is a flowchart of an example method to manage communication sessions, all arranged according to one or more embodiments described in the present disclosure.

FIG. 4 is a flowchart of an example method 400 to manage communication sessions. The method 400 may be arranged in accordance with at least one embodiment described in the present disclosure. The method 400 may be performed, in some embodiments, by a device or system, such as the communication system 108 of FIG. 1, the communication system 208 of FIG. 2, or the computing system 300 of FIG. 3, or another device. In these and other embodiments, the method 400 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method 400 may begin at block 402, where a first communication session between a first first-end device and a first second-end device may be established. The first first-end device may obtain first device audio during the first communication session. In these or other embodiments, the first first-end device may obtain first device video during the first communication session.

At block 404, a second communication session between a second first-end device and a second second-end device may be established. The second first-end device may obtain second device audio during the second communication session. In these or other embodiments, the second first-end device may obtain second device video during the second communication session.

In some embodiments, the second communication session may be established while the first communication session is still established and active. In some embodiments, the first first-end device and the second first-end device may be the same device. Additionally or alternatively, the first first-end device and the second first-end device may be different devices. Furthermore, in some embodiments, the first second-end device and the second second-end device may be the same device. Additionally or alternatively, the first second-end device and the second second-end device may be different devices.

At block 406, the first device audio may be communicated to the second second-end device as second session audio of the second communication session. In some embodiments, the first device audio may be communicated to the second second-end device as second session audio of the second communication session based on the first communication session and the second communication session being determined to be associated with a same interaction between users such as described above with respect to operation 224 of operations 200 of FIG. 2.

It is understood that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

For example, in some embodiments, the method 400 may further include operations related to communicating the second device video to the second first-end device and the second second-end device while communicating the first device audio to the second first-end device and the second second-end device.

In these or other embodiments, the method 400 may include one or more operations related to generating an aggregate transcription based on the first device audio and the second device audio such as described above with respect to operation 234 of operations 200 of FIG. 2. Additionally or alternatively, the method 400 may include one or more operations related to generating one or more indications with respect to the aggregate transcription. By way of example, the indications may indicate establishment of the second communication session, termination of the first communication session, a change in communication session type that corresponds to establishment of the second communication session, or any other indication that may apply such as the indications described above with respect to the operations 200 of FIG. 2.

In some embodiments, the different components, modules, engines, and services described herein may be implemented as objects or processes that execute on a computing system (e.g., as separate threads). While some of the systems and methods described herein are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one"

or "one or more"); the same holds true for the use of definite articles used to introduce claim recitations.

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A computer-implemented method to change a communication session type, the method comprising:
    establishing, via a communications system, a first communication session between a first first-end device and a first second-end device, the first first-end device obtaining first device audio during the first communication session, the first device audio including voice communications of a conversation occurring via the first communication session;
    establishing, via the communications system, a second communication session between a second first-end device and a second second-end device, the second first-end device obtaining second device audio and second device video during the second communication session, the second communication session being separate from the first communication session, the second device audio corresponding to the second device video and including voice communications of a video conversation occurring via the second communication session;
    obtaining, at the communications system, the first device audio from the first first-end device and the second device audio from the second first-end device;
    after establishing the second communication session, communicating, from the communication system, the first device audio of the first communication session to the second second-end device as second session audio of the second communication session in place of communicating the second device audio corresponding to the second device video as the second session audio as part of the second communication session while communicating the second device video to the second second-end device, wherein communicating the first device audio to the second second-end device in place of communicating the second device audio to the second second-end device occurs while both the first communication session and the second communication session are active and the communication system is obtaining both the first device audio of the first communication session from the first first-end device and the second device video and the second device audio of the second communication session from the second first-end device;
    communicating, from the communication system, the second device video from the second first-end device to the second second-end device at the same time as communicating the first device audio from the first first-end device to the second second-end device;
    communicating, in response to termination of the first communication session, the second device audio to the second second-end device as the second session audio of the second communication session; and
    generating an aggregate transcription based on the first device audio and the second device audio.

2. The method of claim 1, wherein the first first-end device and the second first-end device are a same device.

3. The method of claim 2, wherein the first first-end device and the second first-end device are both associated with a first user and the first second-end device and the second second-end device are both associated with a second user.

4. The method of claim 1, wherein the first second-end device and the second second-end device are a same device.

5. The method of claim 1, further comprising generating an indication with respect to the aggregate transcription that indicates establishment of the second communication session.

6. The method of claim 1, further comprising generating an indication with respect to the aggregate transcription that indicates termination of the first communication session.

7. One or more non-transitory computer-readable media configured to store instructions that, in response to being executed by one or more processors, cause one or more systems to perform the method of claim 1.

8. The method of claim 1, further comprising directing the aggregate transcription to either the first first-end device, the second first-end device, the first second-end device, the second second-end device, or some combination of the first first-end device, the second first-end device, the first second-end device, and the second second-end device.

9. A system comprising:
    one or more processors; and
    one or more computer-readable media configured to store instructions that in response to being executed by the one or more processors cause the system to perform operations, the operations comprising:
        establishing, via the system, a first communication session between a first first-end device and a first second-end device;
        establishing, via the system, a second communication session between a second first-end device and a second second-end device, the second communication session being separate from the first communication session;
        obtaining, at the system, first audio from the first first-end device and second video and second audio corresponding to the second video from the second first-end device;
        after establishing the second communication session, communicating, from the system, the first audio of the first communication session to the second second-end device as part of the second communication session in place of communicating the second audio corresponding to the second video to the second second-end device as part of the second communication session while communicating the second video to the second second-end device, wherein communicating the first audio to the second second-end device in place of communicating the second audio to the second second-end device occurs while both the first communication session and the second communication session are active and the system is obtaining both the first audio of the first communication session from the first first-end device and the second video and the second audio of the second communication session from the second first-end device; and generating an aggregate transcription based on the first audio and the second audio obtained by the second first-end device.

10. The system of claim 9, wherein the first first-end device and the second first-end device are a same device.

11. The system of claim 10, wherein the first first-end device and the second first-end device are both associated with a first user and the first second-end device and the second second-end device are both associated with a second user.

12. The system of claim 9, wherein the first second-end device and the second second-end device are a same device.

13. The system of claim 9, wherein the operations further comprise generating an indication with respect to the aggregate transcription that indicates establishment of the second communication session.

14. The system of claim 9, wherein the operations further comprise generating an indication with respect the aggregate transcription that indicates a change of communication session type that corresponds to establishment of the second communication session.

15. The system of claim 9, wherein the operations further comprise directing the aggregate transcription to either the first first-end device, the second first-end device, the first second-end device, the second second-end device, or some combination of the first first-end device, the second first-end device, the first second-end device, and the second second-end device.

16. A computer-implemented method to manage a communication session, the method comprising:

establishing, via a communications system, a first communication session between a first device and a second device;

establishing, via the communications system, a second communication session between the first device and the second device, the second communication session being separate from the first communication session;

obtaining, at the communications system, first audio from the first device of the first communication session and second video and second audio corresponding to the second video from the first device of the second communication session;

after establishing the second communication session, communicating, from the communication system, the first audio of the first communication session to the second device as part of the second communication session in place of communicating the second audio corresponding to the second video to the second device for the second communication session while communicating the second video to the second device, wherein communicating the first audio occurs while both the first communication session and the second communication session are active and the communication system is obtaining the first audio, the second video, and the second audio from the first device; and generating an aggregate transcription based on the first audio and based on second audio obtained by the second device.

17. One or more non-transitory computer-readable media configured to store instructions that, in response to being executed by one or more processors, cause one or more systems to perform the method of claim 16.

18. The method of claim 16, further comprising generating an indication with respect to the aggregate transcription that indicates establishment of the second communication session.

19. The method of claim 16, further comprising generating an indication with respect to the aggregate transcription that indicates termination of the first communication session.

20. The method of claim 16, further comprising directing the aggregate transcription to either the first device, the second device, or the first and second device.

* * * * *